(12) United States Patent
    Geisler

(10) Patent No.: US 10,769,942 B2
(45) Date of Patent: Sep. 8, 2020

(54) METHOD, DEVICE AND SYSTEM FOR WRONG-WAY DRIVER DETECTION

(71) Applicant: Robert Bosch GmbH, Stuttgart (DE)

(72) Inventor: Simon Geisler, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/302,196

(22) PCT Filed: Apr. 13, 2017

(86) PCT No.: PCT/EP2017/058961
    § 371 (c)(1),
    (2) Date: Nov. 16, 2018

(87) PCT Pub. No.: WO2017/211489
    PCT Pub. Date: Dec. 14, 2017

(65) Prior Publication Data
    US 2019/0279504 A1    Sep. 12, 2019

(30) Foreign Application Priority Data
    Jun. 7, 2016  (DE) .......... 10 2016 210 027

(51) Int. Cl.
    *G08G 1/01*     (2006.01)
    *G08G 1/056*    (2006.01)
    (Continued)

(52) U.S. Cl.
    CPC .......... *G08G 1/056* (2013.01); *G01C 21/30* (2013.01); *G01C 21/3697* (2013.01);
    (Continued)

(58) Field of Classification Search
    CPC .... G08G 1/056; G08G 1/0133; G08G 1/0112; G08G 1/164; G01C 21/30
    (Continued)

(56) References Cited

U.S. PATENT DOCUMENTS

2008/0312833 A1* 12/2008 Greene .............. G06K 9/00805
                                                    701/301
2012/0290150 A1   11/2012 Doughty et al.
    (Continued)

FOREIGN PATENT DOCUMENTS

DE    102011120497 A1    6/2012
DE    102012208974 A1   12/2012

OTHER PUBLICATIONS

International Search Report for PCT/EP2017/058961, dated Aug. 10, 2017.
    (Continued)

*Primary Examiner* — Tanmay K Shah
(74) *Attorney, Agent, or Firm* — Norton Rose Fulbright US LLP; Gerard Messina

(57) ABSTRACT

A method for wrong-way driver detection, including a step of reading in position data via an interface, the position data representing a measured position of a vehicle, a step of reading in map data mapping road segments negotiable by the vehicle, a step of reading in a plurality of particles, one particle representing an assumed position of the vehicle and a weighting assigned to the assumed position, and a step of determining a deviation between the plurality of particles and the measured position represented by the position data, using the map data.

17 Claims, 6 Drawing Sheets

(51) Int. Cl.
*G01C 21/30* (2006.01)
*G01C 21/36* (2006.01)
*G08G 1/16* (2006.01)

(52) U.S. Cl.
CPC ......... *G08G 1/0112* (2013.01); *G08G 1/0133* (2013.01); *G08G 1/0145* (2013.01); *G08G 1/164* (2013.01)

(58) Field of Classification Search
USPC ....................................................... 340/935
See application file for complete search history.

(56) References Cited

U.S. PATENT DOCUMENTS

2013/0044009 A1* 2/2013 Tagawa ................. G08G 1/075
                                                              340/995.28
2013/0304374 A1    11/2013 Lee et al.

OTHER PUBLICATIONS

Tao Junli et al., "Wrong Roadway Detection for Multi-lane Roads", Aug. 27, 2013, Network and Parallel Computing; Lecture Notes in Computer Science; Springer International Publishing, p. (S) 50-58, XP047038828.

F. Peyet et al., "Lane-level positioning for cooperative systems using EGNOS and enhanced digital maps", Mar. 31, 2008, XP055393844.

Schindler Andreas, "Vehicle self-localization with high-precision digital maps", 2013 IEEE Intelligent Vehicles Symposium ( I V ), I EEE , Jun. 23, 2013, pp. 141-146, XP032502004.

\* cited by examiner

METHOD, DEVICE AND SYSTEM FOR WRONG-WAY DRIVER DETECTION

BACKGROUND INFORMATION

The present invention is directed to a device and a method for wrong-way driver detection. The present invention also relates to a computer program.

Wrong-way drivers ("ghost drivers") cause at least considerable property damage in the event of an accident. The detection based only on the navigation device (road class and direction) is too late in most instances, i.e., the wrong-way driver is already traveling (at a high driving speed and with a high probability of a collision) on the wrong lane.

SUMMARY

The present invention provides a method, furthermore a device and a system for wrong-way driver detection, and finally a corresponding computer program. The measures described herein allow advantageous refinements of and improvements on the device.

A, for example, cloud-based wrong-way driver warning may advantageously be implemented with a detection which is adapted specifically to the case, using a particle filter.

A method for wrong-way driver detection includes the following steps:

reading in position data via an interface, the position data representing a measured position of a vehicle;

reading in map data mapping road segments negotiable by the vehicle;

reading in a plurality of particles, one particle representing an assumed position of the vehicle and a weighting assigned to the assumed position; and determining a deviation between the plurality of particles and the measured position represented by the position data, using the map data.

Via the deviation, it may be established whether the plurality of particles matches the measured position.

The vehicle may be a road vehicle. Wrong-way driving may be understood to mean a drive of the vehicle on a road counter to a prescribed driving direction. The measured position may have been measured using a sensor situated in the vehicle. The map data may map a road network negotiable by the vehicle. The plurality of particles may have been determined using a method using known particle filters or using a particle filter. The particles may have different assumed positions which, for example, may be grouped around the measured position. The deviation may be used to determine or verify an instantaneous position of the vehicle. The instantaneous position may represent a position estimated using the particle filter, which may be used as an actual position of the vehicle. The instantaneous position may be used instead of the measured position for detecting a wrong-way drive of the vehicle.

The method may include a step of determining a wrong-way driving signal, using the instantaneous position. The wrong-way driving signal may indicate whether or not the vehicle is driving the wrong way.

For example, the wrong-way driving signal may only be provided when a wrong-way drive is assumed.

The method may include a step of determining the plurality of particles, using a particle filter. For example, a weighting of the particles may be changed by the particle filter.

The deviation may be determined in the step of determining, using a distance between the plurality of particles and the measured position. The smaller the distance, for example an average distance, the smaller the deviation will be.

The map data may map parameters of the road network negotiable by the vehicle. In the step of determining, the deviation may be determined using the parameters. By using the parameters, the pieces of information encompassed by the map data may be used to determine the deviation.

The method may include a step of reading in movement data representing measured movements of the vehicle. In the step of determining, the deviation may be determined based on a comparison between the movement data and the parameters. In this way, the deviation may be determined even more precisely.

For example, the movement data may map a transverse acceleration of the vehicle. The parameters may map a course of a curvature of a road segment mapped by the map data, which is assigned or assignable to at least one of the plurality of particles. It may thus be checked whether a road element matches a movement carried out by the vehicle.

The movement data may map a driving direction of the vehicle, and the parameters may map a driving direction specification of a road segment mapped by the map data, which is assigned or assignable to at least one of the plurality of particles. In this way, it may be checked whether a road segment matches a driving direction of the vehicle.

The method may include a step of selecting at least one plausible road segment from the road segments mapped by the map data. The plausible road segment may represent a road segment to which at least one of the plurality of particles is assignable and which includes a driving direction specification agreeing with the driving direction of the vehicle.

In the step of determining, the deviation may be determined based on an assignability of the plurality of particles to the road segments mapped by the map data. If the particles are not assignable to a road segment, this allows a large deviation to be inferred.

In the step of reading in, the position data may be read in via an interface of a so-called processor cloud. This enables a cloud-based solution.

A corresponding device for wrong-way driver detection is configured to carry out steps of the described method in corresponding units. For example, such a device may include a read-in unit, which is designed to read in position data via an interface, a further read-in unit, which is designed to read in map data mapping road segments negotiable by the vehicle, a further read-in unit, which is designed to read in a plurality of particles, one particle representing an assumed position of the vehicle and a weighting assigned to the assumed position, and a determination unit, which is designed to determine a deviation between the plurality of filtered particles and the measured position encompassed by the measuring signal, using the map data. Furthermore, the device may include a particle filter for creating and/or further processing the particles.

A corresponding system for wrong-way driver detection includes at least one transmitter, which is situatable or situated in a vehicle and designed to emit position data, and a described device for wrong-way driver detection, which is designed to receive the position data emitted by the at least one transmitter, for example via a wireless connection.

A further system for wrong-way driver detection includes at least one transmitter, which is situatable or situated in a vehicle and designed to emit position data, the position data representing a measured position of a vehicle, and at least one receiver unit, which is situatable or situated in a vehicle and designed to receive data of a device, which according to the approach described here for wrong-way driver detection is designed to receive the position data emitted by the at least one transmitter.

The described method may be implemented in software or hardware or in a mixed form made up of software and hardware, for example in a device.

For this purpose, the device may include at least one processing unit for processing signals or data, at least one memory unit for storing signals or data and/or at least one communication interface for reading in or outputting data, which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A device in the present invention may be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device.

However, it is also possible for the interfaces to be separate integrated circuits, or to be at least partially made up of discrete elements. In the case of a software design, the interfaces may be software modules which are present on a microcontroller, for example, in addition to other software modules.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the figures and are described in greater detail below

DETAILED DESCRIPTION OF EXAMPLE EMBODIMENTS

Figure 1:
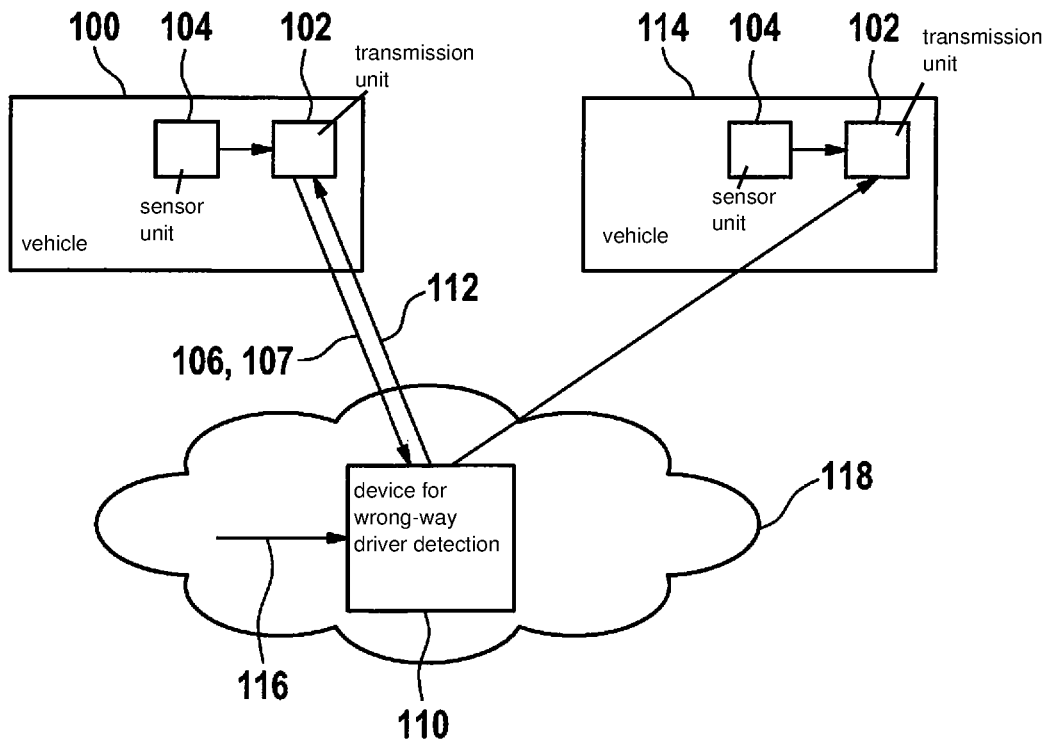
FIG. 1 shows a system for wrong-way driver detection according to one exemplary embodiment.

In the following description of favorable exemplary embodiments of the present invention, identical or similar reference numerals are used for similarly acting elements shown in the different figures, and a repeated description of these elements is dispensed with.

FIG. 1 shows a system for wrong-way driver detection according to one exemplary embodiment. The system includes a vehicle 100, which includes a transmission unit 102 designed to wirelessly emit measuring data, for example position data 106 and optionally movement data 107 here, collected using at least one sensor unit 104 situated in vehicle 100, to a device 110 for wrong-way driver detection. Device 110 is designed to edit measuring data into edited data and to further process the edited data, using a particle filter, to generate and emit a wrong-way driving signal 112. According to one exemplary embodiment, wrong-way driving signal 112 indicates that vehicle 100 whose measuring data were processed is presently driving the wrong way. According to this exemplary embodiment, both transmission unit 102 of vehicle 100 and a transmission unit 102 of a further vehicle 114 are designed to receive wrong-way driving signal 112 and, in response to a reception of wrong-way driving signal 112, to activate a warning unit of the respective vehicle 100, 114 which, for example, warns a driver of the respective vehicle 100, 114 about the wrong-way drive or, according to one exemplary embodiment, intervenes in an at least semi-automatic control, for example of a braking system or steering system, of the respective vehicle 100, 114. According to different exemplary embodiments, transmission unit 102 may only be designed as a transmitter or as a transceiver unit.

According to one exemplary embodiment, the measuring data include position data 106 which were detected using a position determination unit of vehicle 100 and map an instantaneous position of vehicle 100. According to one further exemplary embodiment, the measuring data furthermore include movement data 107, which were detected, for example, using at least one acceleration sensor of vehicle 100 and include pieces of information concerning an instantaneous movement of vehicle 100, for example pieces of information concerning a driving direction, a longitudinal acceleration, a transverse acceleration, or concerning a rotation of the vehicle about a vehicle axis.

According to one exemplary embodiment, device 110 is designed to read in map data 116 which map a road network negotiable by vehicle 100. According to one exemplary embodiment, map data 116 include, for example, pieces of information about road segments of the road network. According to one exemplary embodiment, map data 116, with respect to each road segment, furthermore include at least one parameter which, for example, defines a driving direction specification for the respective road segment or a course of the respective road segment. For example, it may be defined via the parameter whether the road segment extends linearly or follows a curve. According to one specific embodiment, device 110 includes a memory unit in which map data 116 are stored.

According to one exemplary embodiment, device 110 is designed to read in a plurality of particles. For example, the particles may be read in from an internal or an external memory unit. Each particle may represent an assumed position of the vehicle and a weighting assigned to the assumed position. According to one exemplary embodiment, device 110 is designed to determine and directly further process the plurality of particles, using position data 106 and map data 116.

According to one exemplary embodiment, device 110 is designed to determine a deviation between the plurality of particles and the measured position of vehicle 100 mapped by position data 106, using the map data. According to one exemplary embodiment, the deviation is used or considered in the determination of wrong-way driving signal 112.

According to one exemplary embodiment, device 110 is, or functional blocks of device 110 are, situated or implemented in a cloud 118.

The described approach may be used additionally or alternatively to a variety of methods for detecting a wrong-way driver in which, e.g., a video sensor system is used to detect the passing of a "do not enter" sign or the use of a digital map in conjunction with a navigation is utilized to identify a detection of a wrong driving direction on a road segment which is only negotiable in one direction. Furthermore, the approach may be combined with wireless methods, which detect wrong-way drivers with the aid of infrastructure, such as markers in the roadway or on the roadside.

In addition to detecting a wrong-way driver, the described approach offers many options for responding to a wrong-way driver. Examples include the warning of the wrong-way driver directly via a display or acoustic instructions. It is also possible to use methods by which other drivers in the vicinity of a wrong-way driver are warned, e.g., via vehicle-to-vehicle communication or with the aid of mobile communication. Furthermore, it is possible to warn other road users via variable message signs mounted along the roadside. It is also possible for an intervention in the engine control unit or brake of the vehicle 100 driving the wrong way to take place.

The described approach makes it possible to detect a wrong-way driver and to warn other road users in his or her vicinity in a timely manner, for which only very little time is available.

The described approach applies to a wrong-way driver detection with a client-server solution. A client shall be understood to mean a device, situated on or in a motor vehicle, which has an Internet connection and at least access to position coordinates.

For example, it may be transmission unit 102. Transmission unit 102 may be a smart phone, for example. Sensor unit 104 may be integrated into transmission unit 102. In this way, wrong-way driver-specific server-client communication may be implemented with a smart phone as an exemplary client. The smart phone may be connected via a mobile communication network with the aid of a gateway (PDN_GW) to the Internet, in which device 110 may be situated, for example in the form of a server.

From the possible functionalities of a wrong-way driver warning using a client-server solution, the following key problem areas arise for this technology, which are addressed by the approach described here:

a) False Positive Reduction

False positives, i.e., misdetections in the case of correct driving, must be reduced as much as possible, or completely avoided, in the case of a driver warning and/or an active intervention. Depending on the warning concept, the standards up to ASIL A must be met.

b) Time-Critical Execution of the Trigger Chain

To keep the risk for other road users originating from a wrong-way driver as low as possible, an intervention and/or warning should take place as quickly as possible. This means, the entire functional chain from the detection of a critical situation, through the detection of a wrong-way driver, to the intervention or warning should be run through in a preferably short time period. The utilization and thus the necessary performance capability of the server, for example of device 110, during a comprehensive use of this function plays a very important role. In addition to the trigger time, the economic efficiency also represents an important sub-aspect.

c) Communication, Data Efficiency and Power Consumption

The communication and the power consumption must be as efficient and as low as possible, especially for mobile devices, to achieve an acceptable rechargeable battery operating time. The overloading of a mobile communication cell or other wireless communication unit also has to be suppressed by a data-efficient communication. In addition, the data volume and the associated costs have to be limited to the extent possible. The efficiency of the communication is also an extremely important factor on the server side for reasons of processing performance.

The described approach covers especially the key areas a) "false positive reduction" and b) "time-critical execution of the trigger chain", but c) "communication, data efficiency and power consumption" is also possibly influenced. The detection of wrong-way drivers in cloud 118, based on commercially available smart phone and connectivity control unit sensor systems, is no trivial undertaking.

Figure 2:
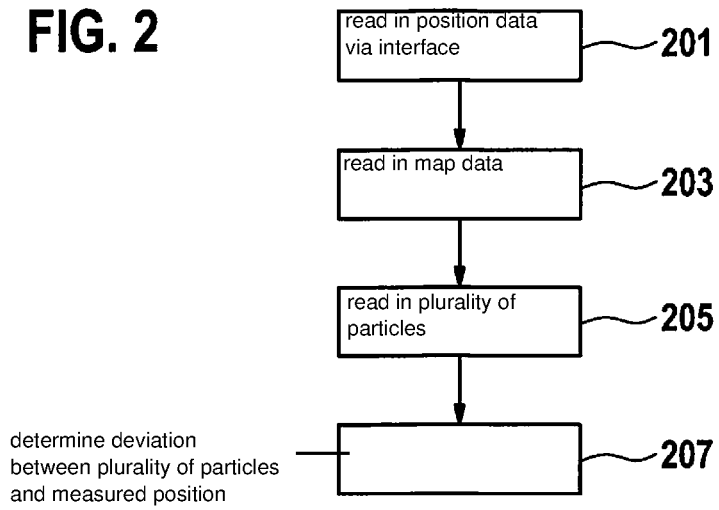
FIG. 2 shows a flow chart of a method for wrong-way driver detection according to one exemplary embodiment.

FIG. 2 shows a flow chart of a method for wrong-way driver detection according to one exemplary embodiment. For example, the method may be carried out using units of the device shown in FIG. 1 for wrong-way driver detection.

The method includes a step 201 in which position data are read in via an interface. The position data represent a measured position of a vehicle. Optionally, movement data of the vehicle may additionally be read in in step 201. In a step 203, map data are read in, which map the road segments negotiable by the vehicle. The map data may include parameters which specify the individual road segments in greater detail, for example with respect to a roadway curvature or driving direction. In a step 205, a plurality of particles is read in. The plurality of particles may have been created in a preceding creation step, for example, using the position data and/or previously filtered particles. According to one exemplary embodiment, a particle filter is used. Each of the particles represents an assumed position of the vehicle and a weighting assigned to the assumed position. According to one exemplary embodiment, the assumed positions are preferably distributed around the measured position. Typically, the assumed positions deviate from the measured position and the actual position of the vehicle. In a step 207, a deviation between the plurality of particles and the measured position represented by the position data is determined, using the map data. The determination of the deviation may represent a substep of steps carried out in the particle filter. According to one exemplary embodiment, an instantaneous position of the vehicle is ascertained based on the plurality of particles and the deviation, using the particle filter.

In a further optional step 209, a wrong-way driving signal is generated and provided, using the plurality of particles and the deviation. For example, the wrong-way driving signal may be provided when a plausible road segment is determined from the multitude of particles and the deviation, for which it is assumed that the vehicle is situated thereon, and an instantaneous driving direction of the vehicle does not agree with a driving direction specification assigned to the road segment. According to one exemplary embodiment, a generation or provision of a wrong-way driving signal is released or suppressed as a function of a comparison of the deviation to a threshold value. For example, a provision of the wrong-way driving signal may be suppressed if it is assumed, due to a large deviation, that an instantaneous position of the vehicle ascertained using the particle filter does not agree with the actual position of the vehicle.

It is not crucial for the wrong-way driver detection to know which route the wrong-way driver traveled. The information which is required is mainly where the wrong-way driver is presently situated, and whether he or she is traveling a road counter to the driving direction. For this ascertainment, the history is required, of course, which, however, is not part of the problem, but rather the path to the result.

Based on these circumstances, a method based on a particle filter is introduced. Similarly to the Kalman filter, the particle filter may be used for systems which are subject to a hidden Markov chain characteristic, i.e., a Markov chain with unobserved states.

Figure 3:
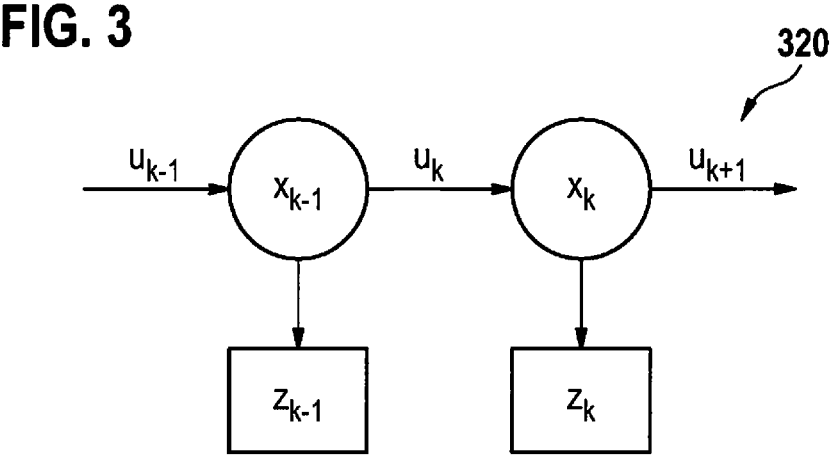
FIG. 3 shows a hidden Markov chain model.

FIG. 3 shows a hidden Markov chain model 320 including state x and observation z at times k and k−1.

This means, the state of a system cannot be measured directly, but may be estimated based on other observations. In this case, the position and thus the instantaneous road must be estimated. For this purpose, the following equation is solved:

$$p(x_k|z_{0:k}, u_{0:k}) = \eta \cdot g(z_k|x_k, z_{0:k-1}, u_{0:k}) \pi(x_k|z_{0:k-1}, u_{0:k})$$

The state at point in time k is described hereafter with $x_k$, and the previous states are summarized with $x_{0:k-1} = (x_0, \ldots, x_{k-1})$.

Analogously to x, this convention also applies to control variables u and observations u. $\eta$ describes a normalization term, which hereafter, however, is not of great importance. This equation may be simplified to the following equation:

$$p(X_k|Z_{0:k}, u_{0:k}) = \eta \cdot g(Z_k|X_k) \int_{x_{k-1}} f(X_k|X_{k-1}, u_k) p(X_{k-1}|Z_{0:k}, u_{0:k}) dX_{k-1}$$

And this is described in two steps: the prediction step $$\pi(x_k|z_{0:k-1}, u_{0:k}) = \int_{x_{k-1}} \underbrace{f(x_k|x_{k-1}, u_k)}_{\text{motion}} p(x_{k-1}|z_{0:k-1}, u_{0:k}) dx_{k-1}$$

and the weighting term:

$$p(x_k|z_{0:k}, u_{0:k}) = \eta \cdot \underbrace{g(z_k|x_k, u_k)}_{\text{observations}} \pi(x_k|z_{0:k-1}, u_{0:k}).$$

In the case of a particle filter, the integral is solved via the probability distributions using a numerical approximation $$\pi(x) = \sum_{i=1}^{J} w^{[j]} \delta(x - x^{[j]})$$

and Monte Carlo methods. $w^{[j]}$ describes the weight/the probability of each jth particle. A set of particles is described with $$x = \{(x^{[j]}, w^{[j]})\}_{j=2,\ldots,J}.$$

In this way, each particle has the weight $w^{[j]}$ and the state $x^{[j]}$.

Figure 4:
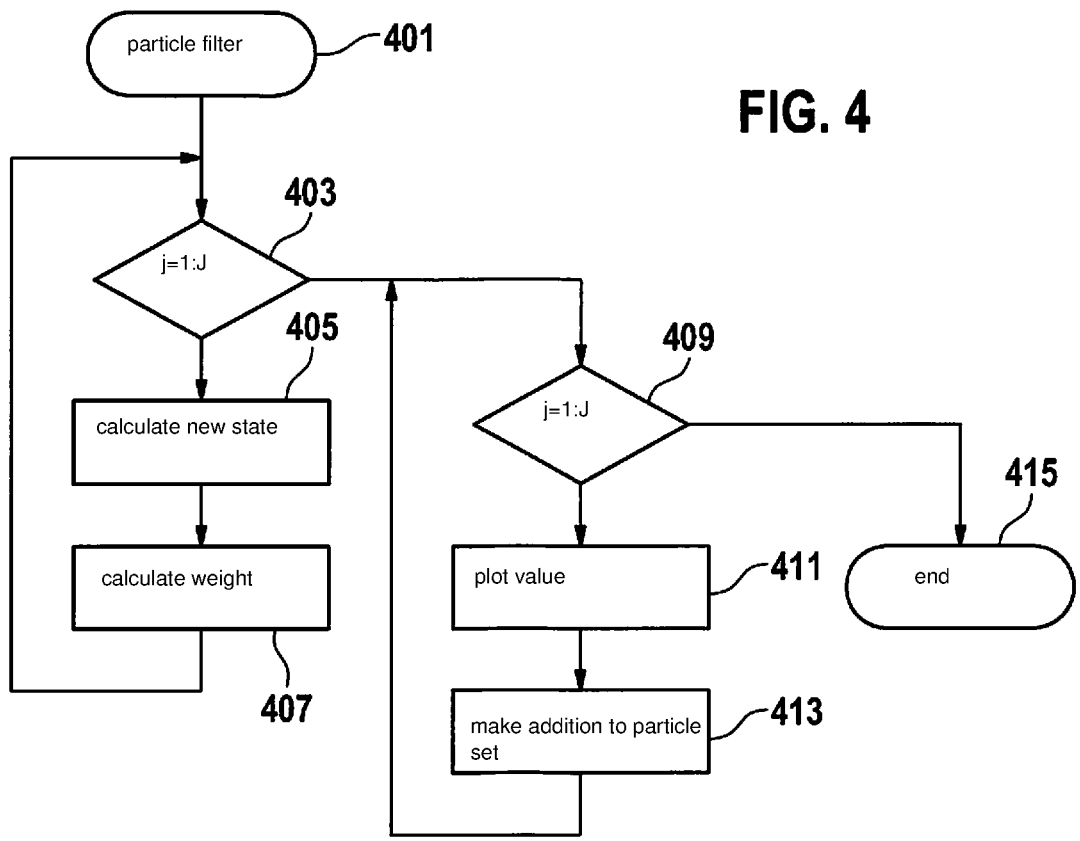
FIG. 4 shows a sequence of a particle filter process according to one exemplary embodiment.

FIG. 4 shows the sequence of a particle filter process according to one exemplary embodiment. For this purpose, FIG. 4 shows a hidden Markov chain model having state x and observation z at times k and k−1.

A large portion of the work is to find a suitable function for $$\underbrace{f(x_k|x_{k-1}, u_k)}_{\text{motion}} \text{ and } \underbrace{g(z_k|x_k, u_k)}_{\text{observations}}$$

which optimally display the problem. For this, it is essential to define states x to be estimated.

Block 401 denotes the particle filter $(x_{k-1}, u_k, z)$.

From block 403, jumps are made to block 405 until all values j=1:J have been run through.

In block 405, a new state is calculated:

$$x_k^{[j]} = f(x_k|x_{k-1}^{[j]}, u_k)$$

In block 407, the weight is calculated:

$$w_k^{[j]} = g(z_k, m_i, |x_k, u_k)$$

When all values have been run through in block 403, a jump to block 409 occurs. From block 409, jumps are made to block 411 until all values j=1:J have been run through.

In block 411, a value according to $w_k^{[i]}$ is plotted.

In block 413, an addition is made to the particle set according to $x_k^{[i]} \to X_k$.

When all values have been run through in block 409, a jump to block 415 occurs, which represents the end $x_k$.

Figure 5:
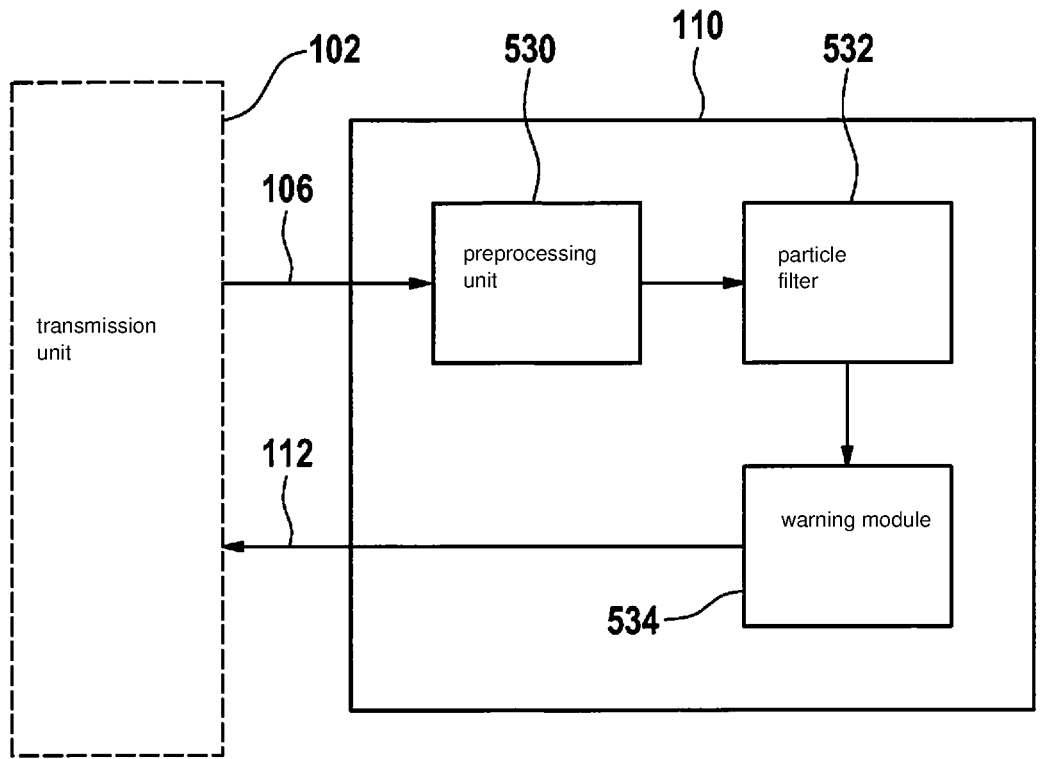
FIG. 5 shows a system for wrong-way driver detection according to one exemplary embodiment.

FIG. 5 shows a system for wrong-way driver detection according to one exemplary embodiment. The system includes units 102, for example in the form of the transmission units described based on FIG. 1, and a device 110 for wrong-way driver detection, which according to this exemplary embodiment is designed as a so-called WDW server. Device 110 is designed to receive data 106, for example measuring data described based on FIG. 1, from unit 102, and to provide a warning 112 based on data 106 and send them back to units 102, for example in the form of the wrong-way driving signal described based on FIG. 1.

The device includes a unit 530 for preprocessing, a particle filter 532 and a warning module 534.

Particle filter 532 is embedded in a simplified architecture of a cloud-based wrong-way driver warning as shown in FIG. 5.

Using particle filter 532, it is possible to approximately determine the probability distribution of the position of the car.

Figure 6:
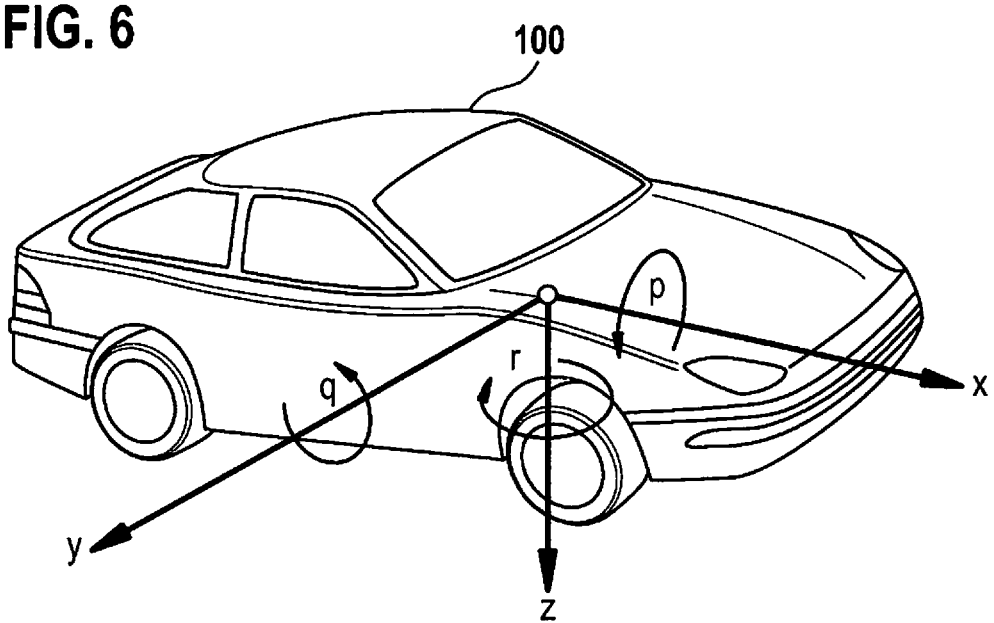
FIG. 6 shows a vehicle according to one exemplary embodiment.

Based on a vehicle 100, FIG. 6 shows values which may be incorporated into the model shown based on FIG. 5. The values may, for example, be states in the direction of longitudinal axis x, transverse axis y, vertical axis z and a rolling p about the longitudinal axis, a pitching q about the transverse axis, and a yawing r about the vertical axis.

With respect to a map matching using the particle filter, for the Bayes filter $p(x_k|z_{0:k}, u_{0:k})$ applies. With reference to FIG. 3, $x_k$ may denote what the state (not measured) is, for example the geographical longitude, latitude and altitude, $u_{k+1}$ may denote how vehicle 100 is moving, for example with respect to the speed and rotation rates, and $z_k$ may denote what may be observed, for example a GPS signal or a signal regarding the surroundings of vehicle 100 (camera, etc.).

Figure 7:
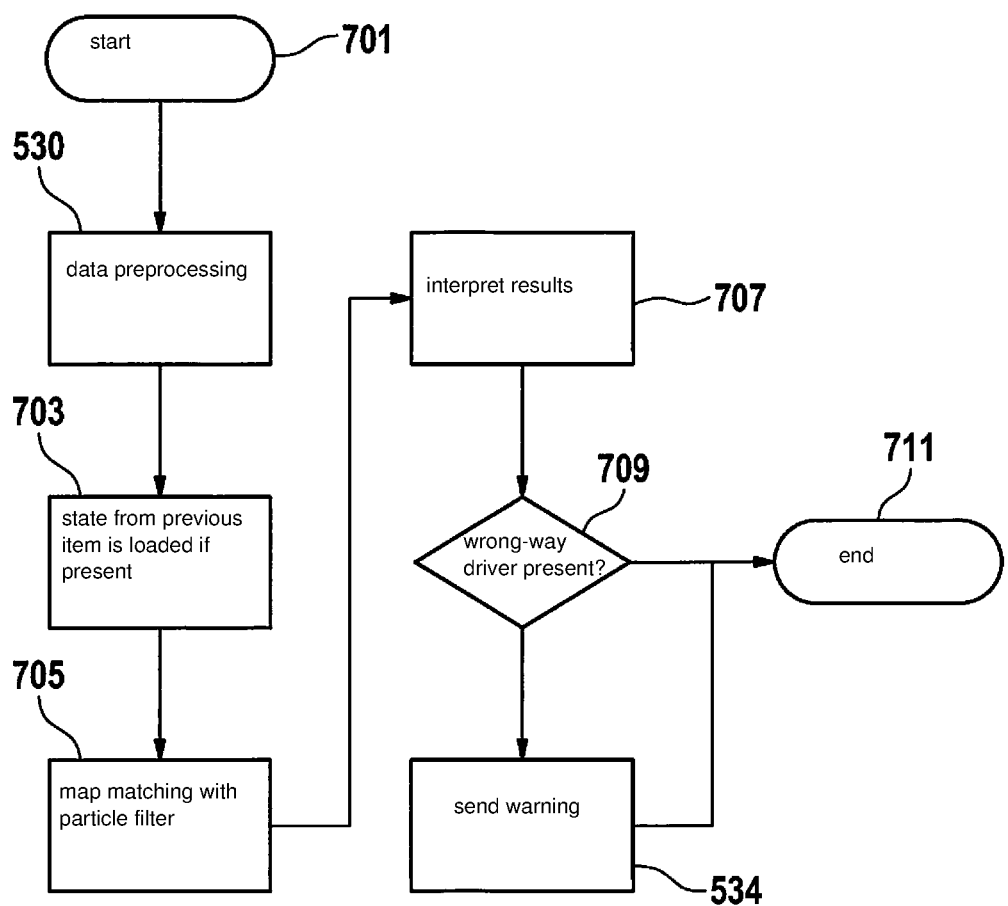
FIG. 7 shows a program sequence according to one exemplary embodiment.

FIG. 7 shows a program sequence according to one exemplary embodiment. The sequence starts with a block 701. In a block 530, a data preprocessing is carried out, as is described based on FIG. 5, for example. In a block 703, if present, the state from the previous item is loaded. In a block 705, a map matching with the particle filter takes place. In a block 707, an interpretation of the results takes place. In a block 709, it is checked whether a wrong-way drive is present. If this is the case, a warning is sent in a block 534, as is described based on FIG. 5, for example. If no wrong-way drive is present, the end of the program sequence takes place with a block 711.

Figure 8:
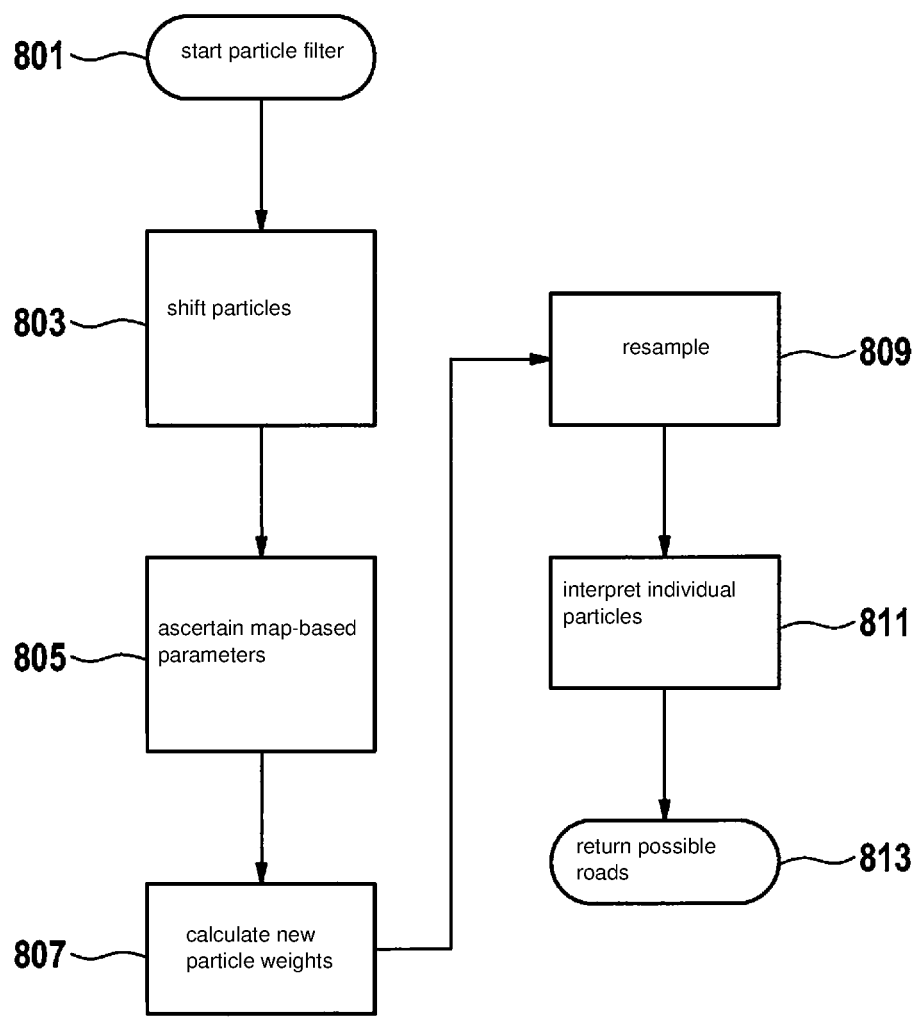
FIG. 8 shows a program sequence of a particle filter according to one exemplary embodiment.

FIG. 8 shows a program sequence of a particle filter according to one exemplary embodiment. A block 801 denotes a start of the particle filter. In a block 803, a shifting of the particles takes place, taking the sensor inaccuracy into consideration, for example of the sensor unit described based on FIG. 1. In a block 805, an ascertainment of the map-based parameters takes place. Such a parameter indicates, for example, whether a particle is situated on a road or what the name thereof is. In a block 807, a calculation of the new particle weights takes place. In a block 809, a so-called resampling takes place, in which the irrelevant areas and/or particles are eliminated. In a block 811, an interpretation of the individual particles takes place, and in a block 813, a return of the possible roads takes place.

By using the particle filter, the aspects described below are improved. On the one hand, a sequentially (possible in real time) operating method is created, which primarily ascertains the instantaneous position on the road network. Furthermore, a robust estimation of the instantaneous position on the road network is possible. An uncertainty is ascertainable via the instantaneous estimation. This makes it possible to be able to reliably delay the decision about a potential wrong-way drive, to a useful degree.

Figure 9:
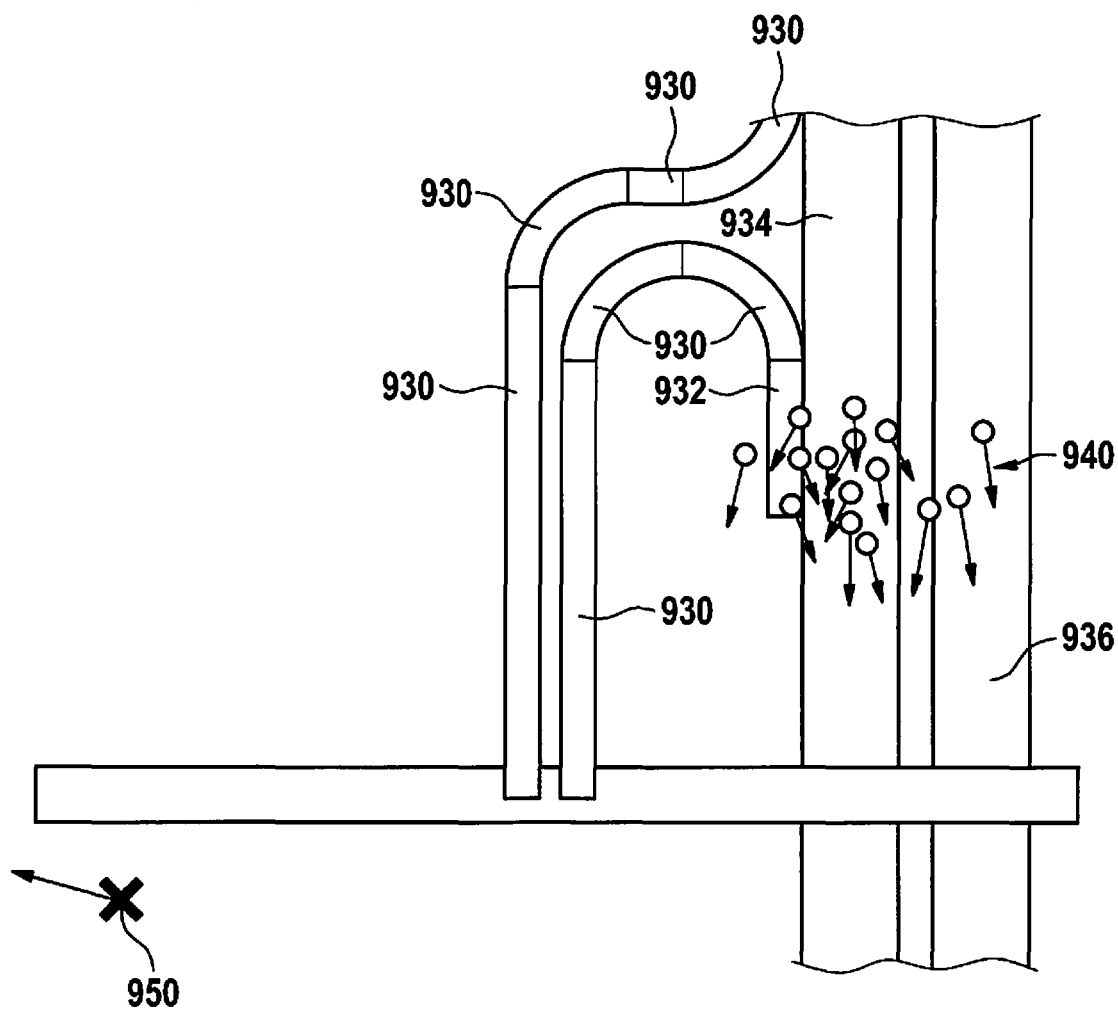
FIG. 9 shows a representation of road segments according to one exemplary embodiment.

FIG. 9 shows a representation of road segments 930, 932, 934, 936 according to one exemplary embodiment. Road segments 930, 932, 934, 936 are part of a road network negotiable by a vehicle, for example the vehicle described based on FIG. 1. A plurality 940 of particles is essentially distributed among the three road segments 932, 934, 936. Each of the particles shows an assumed position and a related assumed probability or weighting. As is apparent from FIG. 9, a measured position 950 of the vehicle considerably deviates from the positions assumed for plurality 940 of particles. Measured position 950 is also assigned a direction vector which represents a measured driving direction of the vehicle and may have been determined using movement data which were received from the vehicle. A direction vector, which indicates a movement direction of the respective particle, is also assigned to each of plurality 940 of particles. It is again apparent from FIG. 9 that the direction vector assigned to measured position 950 does not agree with the direction vectors assigned to plurality 940 of particles.

According to one exemplary embodiment, as described based on the preceding figures, plurality 940 of particles has been determined using a particle filter. According to one exemplary embodiment, a deviation between measured position 950 and the assumed positions of plurality 940 of particles is determined as a sub-functionality of the particle filter. The deviation may then be used, for example, for further filtering plurality 940 of particles.

The approach described here is integrated into a portion of the particle filter shown based on FIG. 5, for example.

Even the best method will partially not be able to reliably match the vehicle with a road, due to various circumstances, such as erroneous map data. As a result, it is possible that the sensor data (observations, controls) do not match the instantaneous road and, for example, the position of particles 940 deviates greatly from GPS. This is shown in FIG. 9, for example.

Particles 940 represent particles from an instantaneous calculation cycle (k) with direction vector. Position 950 represents an instantaneous (k) GPS position with direction vector.

For detecting this state, various measures may be calculated, which provide an indication that the positions of the particles do not agree with the observations. Parameters could be (including the behavior/change over time):

Curvature of the road on which a particle 940 is situated does not agree with sensor data.

Heading of the road on which a particle 940 is situated does not agree with sensor data.

A very large number of particles 940 is shifted in such a way that they do not end up on a road.

The median/mean value/minimum value/maximum value of the distance between particles 940 and GPS position 950 is unusually high.

In this case, it lends itself, for example, that the conditions for the topology are canceled (fallback level).

If no particle 940 is situated on a road (fallback level), according to one exemplary embodiment the weighting equation (observation model) is adapted as follows:

$$g(z_k, m_k | x_k) = p(z_k | x_k)$$

For both fallback levels, no road which is situated counter to the driving direction should be considered due to the susceptibility to false positives in the case that particles 940 land on roads again. This means, particles 940 may thus migrate onto any road, except for roads to be negotiated counter to the driving direction. For example, in the exemplary embodiment shown in FIG. 9, road element 936 would be excluded as a possible position for particles 940 since this portion of the expressway is situated counter to the movement direction.

The described approach may be used in connection with a cloud-based wrong-way driver warning with a detection which is specifically adapted to the application, using a particle filter. Particularly advantageous are the conditions for the two described fallback levels and the approach when roads are found again.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method comprising:
reading in position data via an interface, the position data representing a measured position of a vehicle;
reading in map data mapping road segments negotiable by the vehicle;
reading in a plurality of particles that each represents an assumed position of the vehicle and a weighting assigned to the assumed position;
determining a deviation between the plurality of particles and the measured position represented by the position data, using the map data;
determining a plausible road segment of the road segments of the map data based on the deviation, for which it is assumed that the vehicle is situated thereon;

comparing an instantaneous driving direction of the vehicle with a driving direction assigned to the determined road segment in the map data; and
determining that the vehicle is driving in a wrong direction based on the comparing.

2. The method as recited in claim 1, further comprising:
providing a wrong-way driving signal using the plurality of particles and the deviation, the wrong-way driving signal indicating whether or not a wrong-way drive of the vehicle is present.

3. The method as recited in claim 1, further comprising:
determining the plurality of particles using a particle filter.

4. The method as recited in claim 1, wherein, in the step of determining the deviation, the deviation is determined using a distance between the plurality of particles and the measured position.

5. The method as recited in claim 1, wherein the map data map parameters of a road network negotiable by the vehicle, and in the step of determining the deviation, the deviation is determined using the parameters.

6. The method as recited in claim 5, further comprising:
reading in movement data representing measured movements of the vehicle, and in the step of determining the deviation, the deviation is determined based on a comparison between the movement data and the parameters.

7. The method as recited in claim 6, wherein the movement data map a transverse acceleration of the vehicle, and the parameters map a course of a curvature of a road segment mapped by the map data, which is assigned or assignable to at least one of the plurality of particles.

8. The method as recited in claim 6, wherein the movement data map a driving direction of the vehicle, and the parameters map a driving direction specification of a road segment mapped by the map data, which is assigned or assignable to at least one of the plurality of particles.

9. The method as recited in claim 8, further comprising:
selecting at least one plausible road segment from the road segments mapped by the map data, the plausible road segment representing a road segment to which at least one of the plurality of particles is assignable and which has a driving direction specification agreeing with the driving direction of the vehicle.

10. The method as recited in claim 1, wherein, in the step of determining the deviation, the deviation is determined based on an assignability of the plurality of particles to the road segments mapped by the map data.

11. The method as recited in claim 1, wherein, in the reading in of the position data step, the position data are read in via an interface of a processor cloud.

12. A device comprising:
a processor; and
at least one interface;
wherein the processor is configured to:
read in position data via the at least one interface, the position data representing a measured position of a vehicle;
read in map data mapping road segments negotiable by the vehicle;
read in a plurality of particles that each represents an assumed position of the vehicle and a weighting assigned to the assumed position;
determine a deviation between the plurality of particles and the measured position represented by the position data, using the map data;
determine a plausible road segment of the road segments of the map data based on the deviation, for which it is assumed that the vehicle is situated thereon;
compare an instantaneous driving direction of the vehicle with a driving direction assigned to the determined road segment in the map data; and
determine that the vehicle is driving in a wrong direction based on the comparing.

13. A system comprising:
at least one transmitter which is situatable or situated in a vehicle and designed to emit position data, the position data representing a measured position of a vehicle; and
a device that includes a processor, wherein the processor is configured to:
receive the position data emitted by the at least one transmitter via an interface;
read in map data mapping road segments negotiable by the vehicle;
read in a plurality of particles that each represents an assumed position of the vehicle and a weighting assigned to the assumed position;
determine a deviation between the plurality of particles and the measured position represented by the position data, using the map data;
determine a plausible road segment of the road segments of the map data based on the deviation, for which it is assumed that the vehicle is situated thereon;
compare an instantaneous driving direction of the vehicle with a driving direction assigned to the determined road segment in the map data; and
determine that the vehicle is driving in a wrong direction based on the comparing.

14. A non-transitory machine-readable memory medium on which is stored a computer program that is executable by a computer and that, when executed by the computer, causes the computer to perform a method, the method comprising:
reading in position data via an interface, the position data representing a measured position of a vehicle;
reading in map data mapping road segments negotiable by the vehicle;
reading in a plurality of particles that each represents an assumed position of the vehicle and a weighting assigned to the assumed position;
determining a deviation between the plurality of particles and the measured position represented by the position data, using the map data;
determining a plausible road segment of the road segments of the map data based on the deviation, for which it is assumed that the vehicle is situated thereon;
comparing an instantaneous driving direction of the vehicle with a driving direction assigned to the determined road segment in the map data; and
determining that the vehicle is driving in a wrong direction based on the comparing.

15. The method as recited in claim 1, wherein the determination of the deviation is obtained by performing a comparison between information of the emitted position data and information of the plurality of particles, and the method further comprises revising the plurality of particles for future comparisons based on the emitted position data.

16. The method as recited in claim 1, further comprising:
determining a road segment of the road segments of the map data as being implausible for the vehicle to be situated on based on the deviation.

17. The method as recited in claim 16, wherein the implausible road segment is determined when at least one of: a curvature of the implausible road segment does not agree with the position data, or a heading of the implausible road segment does not agree with the position data.

\* \* \* \* \*